April 22, 1958 K. PERKINS 2,831,991
DYNAMOELECTRIC MACHINE ARMATURES
Filed June 13, 1956 2 Sheets-Sheet 1

WITNESS
Nicholas Leszczak

INVENTOR.
Kenneth Perkins
BY
Marshall J. Breen
ATTORNEY

April 22, 1958 K. PERKINS 2,831,991
DYNAMOELECTRIC MACHINE ARMATURES
Filed June 13, 1956 2 Sheets-Sheet 2

INVENTOR.
Kenneth Perkins
BY
Marshall J. Breen
ATTORNEY

WITNESS
Nicholas Leozczak

United States Patent Office 2,831,991
Patented Apr. 22, 1958

2,831,991

DYNAMOELECTRIC MACHINE ARMATURES

Kenneth Perkins, Scotch Plains, N. J., assignor to The Singer Manufacturing Company, Elizabeth, N. J., a corporation of New Jersey Application June 13, 1956, Serial No. 591,110

3 Claims. (Cl. 310—43)

This invention relates to an armature structure for a dynamoelectric machine and more especially to a wound armature having a commutator formed with an insulating body which is cast in place after the winding is applied and is integral with the winding insulation itself.

It has heretofore been customary in the art of dynamoelectric machine construction to form the commutator as a separate unit to be pressed on the shaft at some stage of the armature assembly and to effect the final varnish dipping and baking of the armature as a separate step.

According to this invention the final step of insulating the armature is combined with the step of casting the supporting insulation for the commutator, thus simplifying the assembly and improving the insulating quality by providing an easily cast integral insulation mass in which are embedded the winding conductors and the commutator segments.

One of the objects of this invention is to support and hold the commutator segments with the same catalytically-hardened casting resin used to insulate and hold the armature conductors.

Another object of this invention is to provide a holding fixture for temporarily positioning the commutator segments, which fixture becomes subsequently a permanent cast-in element of the armature.

Other, further and more specific objects of my invention will become readily apparent to persons skilled in the art from a consideration of the following description when taken in conjunction with the drawings, wherein.

Figure 1:
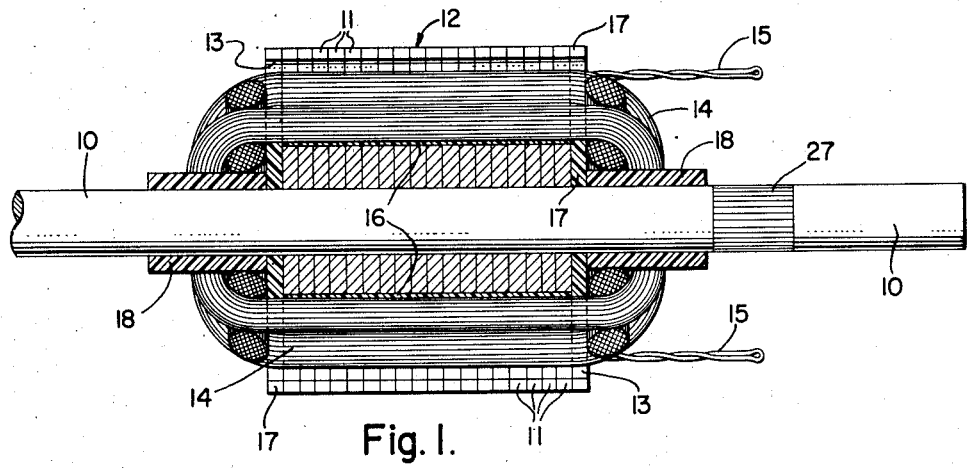
Fig. 1 is a longitudinal sectional view taken through an armature structure at an early stage in its construction embodying the invention.

Referring to Fig. 1, 10 denotes a shaft on which are stacked magnetic laminations 11 to form a core 12 containing longitudinal slots 13. A conventional winding of insulated conductors 14 is placed in the slots 13 and around the ends of the core 12 with commutator leads 15 brought out at one end. Slot insulation 16, insulating end laminations 17 and insulating tubes 18 are used in the usual manner.

Figure 2:
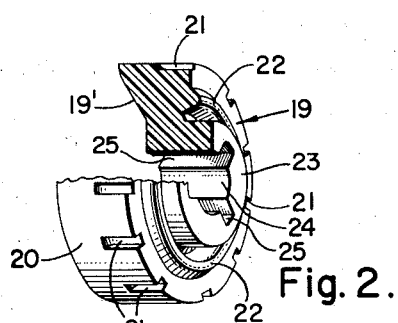
Fig. 2 is a broken-away perspective view showing details of a supporting ring used in the structure of the invention.

Up to this stage of the armature assembly everything is conventional but at this point, according to the invention, prior practice is dispensed with and a new element is introduced. It is a commutator supporting ring 19 made of molded insulation, such as Bakelite, and is shown in detail in Fig. 2. This ring is of generally annular shape having an outer peripheral surface 20 in which are formed spaced seats or pockets 21. One end face is formed with an annular lip portion 22 and a hub portion 23 containing a central cylindrical aperture 24 with connecting radial slots 25. The other end face 19' is generally funnel-shaped.

Figure 4:
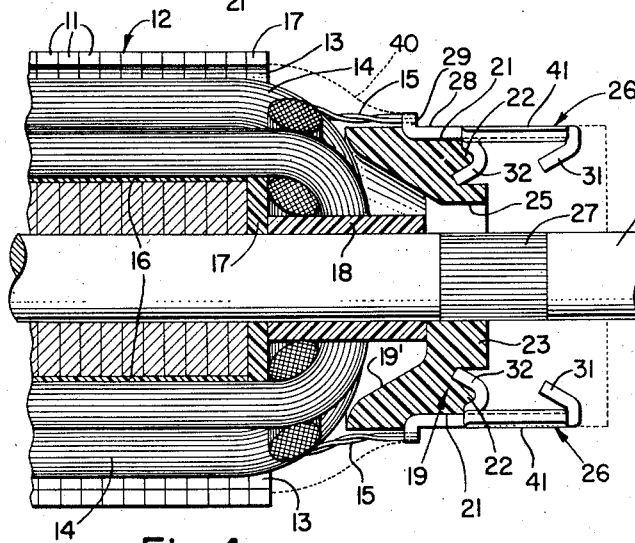
Fig. 4 is a partial longitudinal sectional view of the armature of Fig. 2 at a later stage in its construction.

The supporting ring 19 is pressed onto the straight-knurled portion 27 of the shaft 10 until it shoulders against the insulating tube 18 as shown in Fig. 4. It will be seen that, in this position of the ring, there is easy access from the commutator end to the winding conductors 14 through the radial slots 25, a matter of considerable importance as will later be evident.

Figure 3:
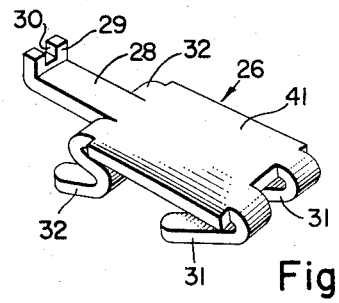
Fig. 3 is an enlarged perspective view of a single commutator segment used in the structure of the invention.
Figure 5:
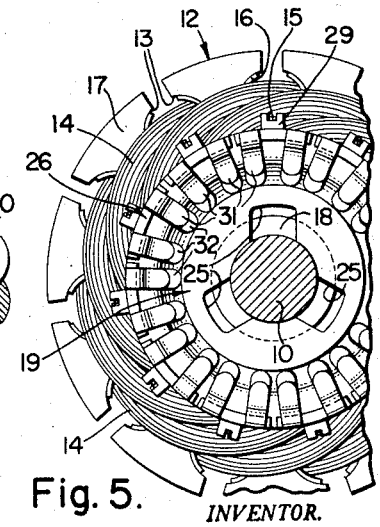
Fig. 5 is an end elevational view of the armature of Fig. 4.

Pressed into each of the seats 21 in the ring 19 is a commutator segment 26 having the shape shown in detail in Fig. 3. The segment is made preferably from flat copper stock and is formed with a body portion having a working face 41 with a slightly arcuate shape. A narrow riser portion 28 extends from the body of the segment and terminates in a turned-up portion 29 which carries a slot 30 for receiving the commutator leads 15 from the armature winding. Depending from the body of the segment 26 are pairs 31 and 32 of reversely-bent tongue elements which are ultimately used to key the segment into a cast insulating mass. As seen best in Figs. 4 and 5, the segments 26 are mounted on the supporting ring 19 with the riser portions 28 occupying the seats 21 and the pair of tongues 32 straddling the annular lip portion 22. This frictional holding of the segments 26 is temporary and facilitates the attachment of the winding leads 15 by soldering or other suitable means and later helps position the segments in the mold.

Figure 6:
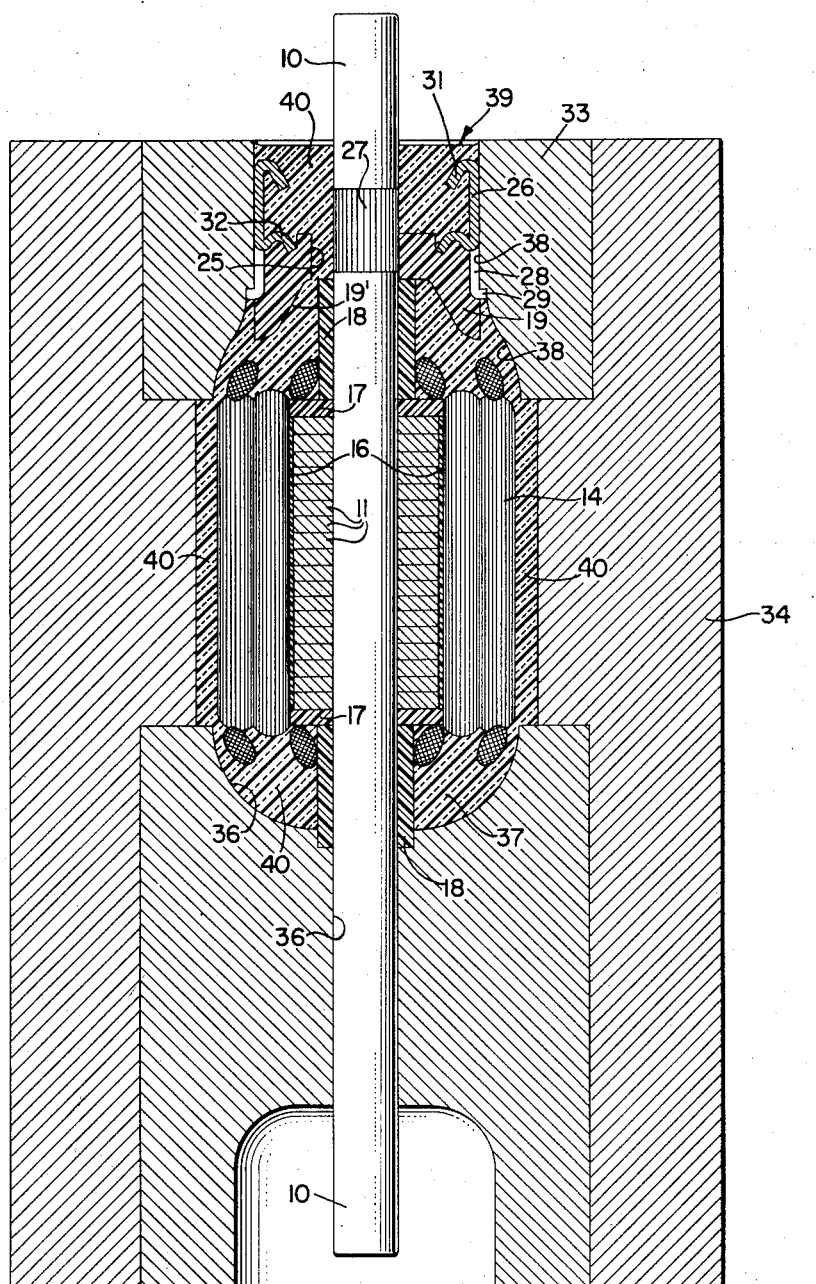
Fig. 6 is a sectional view of an armature just prior to its removal from a mold.

The assembly is then put into an open mold as seen in Fig. 6 and is positioned with the shaft 10 vertical and the commutator end at the top. To facilitate removal, the mold is preferably made of three interfitting parts 33, 34 and 35. A lower part 35 has a cavity 36 conforming to the shaft and setting the shape of the end-turn portion 37 of the winding. An intermediate part 34 completely encloses the cylindrical periphery of the core 12 and a top part 33 has a cavity 38 setting the shape of the commutator and riser portion of the armature and presents an open cup surrounding the shaft 10. Before assembling the mold parts 33, 34 and 35, all the inner surfaces are coated with a releasing agent such as silicone grease to prevent sticking to the casting resin and to facilitate release of the parts. A liquid casting resin having a catalytic hardener is poured into the mold at the top, passes downwardly through the radial slots 25 in the ring 19 into the winding mass at the commutator end, thence down through the slots 13 in the core 12 and, due to its low viscosity, penetrates all voids in the winding filling the bottom cavity 36 first, then with a rising level the resin fills in all spaces between conductors 14 and finally rises into the space between the commutator segments 26 and the shaft 10 at the straight knurled portion 27 embeds the tongue elements 31 and 32 of the segments until the level reaches the top of the mold at 39. The resin is then cured in place by applying heat for a specified time after which the mold is disassembled and the armature removed.

The result is a completely wound armature with commutator in which all the current-carrying elements are embedded in a substantially impervious integral insulating mass 40 and only the working faces 41 of the commutator segments 26 and the periphery of the core 12 are left exposed.

The following is indicative of a practical mode of making an armature in accordance with this invention.

The material used for casting the integral armature and commutator is Epon 828 epoxy resin and Epon "Z" curing agent sold by Shell Chemical Co.

The mixture consists of 100 parts Epon 828 resin, 20 parts Epon "Z" curing agent and 25 parts of P–1 Wollastonite (silica). This is thoroughly mixed at room temperature.

The armature is placed in a steel mold which has been previously coated with Dow Corning R–671 mold release resin and cured.

The mold and armature is pre-heated to 200–225° F. before pouring. The mold is then removed from the oven and filled with the epoxy resin. It is then allowed to cool until it is below 150° F.

Curing is done at 150° F. for 2 hours; 2 hours at 250° F. and 1 hour at 300° F.

Epoxy resin #ERL 2774, made by Bakelite Co. may be used in place of Epon 828 resin. Metaphenylene diamine may be used in place of Epon "Z" curing agent.

It is evident that any suitable form of casting resin may be used in the performance of this invention, such as a polyester liquid type casting resin which will harden under the application of heat.

There is commercially available a large group of the so-called epoxy or epoxide resins with associated hardeners which would be suitable for this process. In curing, gaseous products are not formed and solvent is not evaporated from resins of this type, nor is pressure necessary to effect a cure.

This improved armature construction eliminates the need for the troublesome dipping and baking operation commonly used and the smooth external contours produced by the molding process prevent the accumulation of dirt, and decrease the windage loss. There are no voids to disturb the streamlined flow of air over the solid armature surfaces.

Having thus set forth the nature of the invention, what I claim herein is:

1. The method of making a wound armature and commutator assembly having integral insulating means for the winding and commutator comprising the steps of stacking magnetic laminations on a shaft to form a core, winding insulated current-carrying conductors on the core leaving commutator leads extended at one end, pressing onto said shaft adjacent the commutator leads a perforate molded insulation ring, temporarily securing commutator segments in spaced peripheral relation on said ring, joining each extended lead with a respective commutator segment, placing the assembly in an open mold with the shaft vertically positioned with the commutator end at the top, pouring into the mold a liquid casting resin and curing the resin to encase the winding conductors and to fix the commutator segments in their permanent positions in an integral mass of solid insulation.

2. A composite armature-commutator assembly comprising a shaft, a laminated magnetic core fixed on said shaft, longitudinal slots formed in said core, a current-carrying winding in said slots, an insulated annular supporting ring pressed onto said shaft and formed with circumferentially spaced seats in the outer periphery and with slots in the inner periphery communicating with both ends of the ring, separate commutator segments positioned in said seats and connected to said winding, and a non-pressure type cast resin filling the slots in the core and the ring and the voids in the winding and securing the commutator segments to the shaft in spaced position determined by the supporting ring.

3. The method of making armatures comprising the steps of winding current-carrying conductors on a magnetic core fixed to a shaft, temporarily supporting commutator segments in spaced position on a perforate premolded ring fixed to said shaft, connecting said segments to appropriate conductors, placing the assembly in an open mold, pouring a liquid casting resin into said mold and curing said resin to embed the conductors, the premolded ring and parts of the commutator segments permanently in an integral mass of insulating material.

References Cited in the file of this patent
UNITED STATES PATENTS
1,894,723   Apple _____ Jan. 17, 1933